(12) United States Patent
Ukai

(10) Patent No.: US 7,853,756 B2
(45) Date of Patent: Dec. 14, 2010

(54) INFORMATION PROCESSING DEVICE, PROCESSOR, PROCESSOR CONTROL METHOD, INFORMATION PROCESSING DEVICE CONTROL METHOD AND CACHE MEMORY

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 10/937,253

(22) Filed: Sep. 10, 2004

(65) Prior Publication Data

US 2005/0246506 A1 Nov. 3, 2005

(30) Foreign Application Priority Data

Apr. 30, 2004 (JP) ............................. 2004-135875

(51) Int. Cl.
G06F 13/00 (2006.01)
(52) U.S. Cl. ................... 711/152; 711/141; 711/163; 712/216; 712/233; 714/763
(58) Field of Classification Search ................ 711/152, 711/141, 163; 712/216, 233; 714/763
See application file for complete search history.

(56) References Cited

U.S. PATENT DOCUMENTS

| 4,513,367 | A | | 4/1985 | Chan et al. | |
|---|---|---|---|---|---|
| 4,780,843 | A | | 10/1988 | Tietjen | |
| 5,623,629 | A | * | 4/1997 | Suzuki | ................... 711/141 |
| 6,189,088 | B1 | * | 2/2001 | Gschwind | ................... 712/216 |
| 6,493,741 | B1 | | 12/2002 | Emer et al. | |
| 6,802,039 | B1 | * | 10/2004 | Quach et al. | ................ 714/763 |
| 6,836,824 | B1 | * | 12/2004 | Mirov et al. | ................ 711/118 |
| 6,986,015 | B2 | * | 1/2006 | Testardi | ................... 711/202 |
| 2002/0013872 | A1 | | 1/2002 | Yamada | |
| 2003/0033510 | A1 | * | 2/2003 | Dice | ................... 712/235 |
| 2003/0126186 | A1 | | 7/2003 | Rodgers et al. | |
| 2003/0126375 | A1 | * | 7/2003 | Hill et al. | ................... 711/145 |
| 2004/0128456 | A1 | * | 7/2004 | Kobayashi et al. | .......... 711/162 |
| 2004/0210723 | A1 | | 10/2004 | Naruse et al. | |
| 2005/0187939 | A1 | * | 8/2005 | Krithivas | ................... 707/10 |

FOREIGN PATENT DOCUMENTS

JP 57-158081 9/1985

(Continued)

OTHER PUBLICATIONS

The SPARC Architecture Manual Version 9 J Programming with the Memory Models (with a note; this appendix is informative only. It is not part of the SPARC-V9 specification.) (SPARC Int'l Inc.) ISBN 0-13-25001-4 pp. 323-338.

(Continued)

*Primary Examiner*—Yong Choe
(74) *Attorney, Agent, or Firm*—Staas & Halsey LLP

(57) ABSTRACT

In a method for controlling a processor which accesses information of a storage device through cache memory, when reading information stored in a target address or an address range of the storage device, it is monitored whether there is an update access to the address or address range from another processor, and also the processor is entered into a suspense status, which is released using the occurrence of the update access to the storage device from another processor as a trigger.

25 Claims, 23 Drawing Sheets

FOREIGN PATENT DOCUMENTS

| | | |
|---|---|---|
| JP | 61-229150 | 10/1986 |
| JP | 3-81859 | 4/1991 |
| JP | 3-164964 | 7/1991 |
| JP | 05-127996 | 5/1993 |
| JP | 5-225149 | 9/1993 |
| JP | 11-282815 | 10/1999 |
| JP | 2002-41489 | 2/2002 |
| JP | 2006-500639 | 1/2006 |
| WO | 03/040948 | 5/2003 |
| WO | 03/058447 | 7/2003 |

OTHER PUBLICATIONS

"System/370 Principles of Operation" (IBM) SA22-7832-00 pp. 4-5~4-6.

"Intel Architecture Software Developers Manual vol. 2" (intel) Instruction Set Reference p. 3-291.

European Search Report issued in corresponding European Application No. 04225531.8, on Aug. 3, 2007.

Japanese Office Action mailed on Jun. 16, 2009 in corresponding Japanese Patent Application 2004-135875 (3 pages) (3 pages English translation).

English Patent Abstracts of Japan, Japanese Publication No. 10-124316, Published May 15, 1998.

English Patent Abstract of Japan, Japanese Publication No. 2001-236226, Published Aug. 31, 2001.

Japanese Office Action mailed Mar. 3, 2009 in corresponding Japanese Patent Application 2004-135875 (3 pages) (2 pages English Translation).

\* cited by examiner

```
                         // COMMENTS
try:
     mov  [ID],  %l0      // MOVE THE MEMORY CONTENTS OF [ID] TO A REGISTER
                          //  %l0.
     cas  [lock], %g0, %l0 // COMPARE THE MEMORY CONTENTS OF [LOCK] WITH THE
                          //  VALUE OF A ZERO REGISTER %0.
                          // IF THEY COINCIDE WITH EACH OTHER, [LOCK] AND THE
                          //  VALUE OF %l0 ARE EXCHANGED.
     tst  %l0             // CHECK WHETHER THE VALUE OF THE REGISTER %l0 IS 0.
     bne  rty             // IF THE CHECK RESULT OF TST IS NOT 0, THE
                          //  EXECUTION POINT IS BRANCHED TO TRY:. HOWEVER,
                          // EXECUTE AN INSTRUCTION IMMEDIATELY AFTER (DELAY
                          //  INSTRUCTION PROCESS) REGARDLESS OF THE
                          //  EXISTENCE/NON-EXISTENCE OF A BRANCH.
     nop                  // AN INSTRUCTION TO DO NOTHING. DUE TO THE DELAY
                          //  INSTRUCTION PROCESS OF BNE ABOVE
out:
     ...   ! Lock held    //SUCCEEDED IN LOCKING
```

FIG. 1

```
loop:
        ld      [lock], %l0      // LOAD THE MEMORY CONTENTS OF [LOCK] ONTO THE
                                 //  ZERO REGISTER %l0.
        tst     %l0
        bne     loop
        nop
try:
        mov     [ID], %l0
        cas     [lock], %g0, %l0
        tst     %l0
        bne     loop
        nop
out:
        . . .           ! Lock held        //SUCCEEDED IN LOCKING
```

F I G. 2

IN THE CASE OF THE PRESENT INVENTION

IN THE CASE OF THE RELATED ART

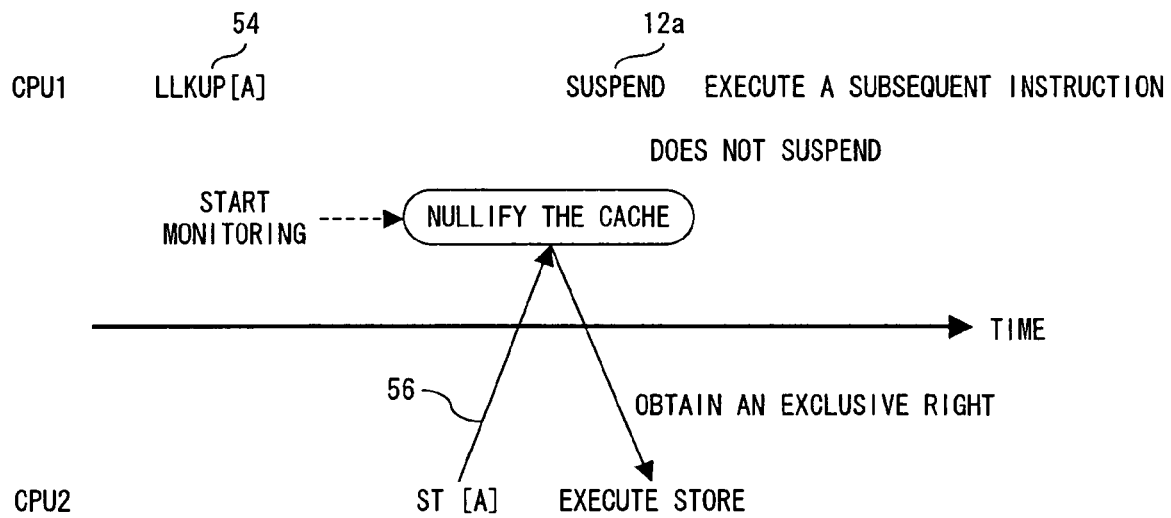
F I G. 6 ld   [lock], %l0
ld   [lock], %l0
ld   [lock], %l0

F I G.  7

```
ld   [lock], %l0
mov  [ID],   %l0
cas  [lock], %g0, %l0    //%0 IS ALWAYS 0 REGISTER
ld   [lock], %l0
ld   [lock], %l0
ld   [lock], %l0
...
```

F I G. 8

```
mov  [ID],    %l0
cas  [lock],  %g0,  %l0
ld   [lock],  %l0
ld   [lock],  %l0
ld   [lock],  %l0
...
```

FIG. 9

```
cas   [lock], %g0, %l0
ld    [lock], %l0
```

FIG. 10

```
cas    [lock], %g0, %l0
cas    [lock], %g0, %l0
cas    [lock], %g0, %l0
 . . .
```

FIG. 11

```
loop:
    llkup   [lock], %l0
    tst     %l0
    bne, a  loop            // IF BRANCH CONDITIONS ARE MET, "SUSPEND"
                            IMMEDIATELY AFTER IS EXECUTED.
    suspend                 // IF THEY ARE NOT MET, "SUSPEND" IMMEDIATELY
                            AFTER IS NOT EXECUTED.
try:
    mov     [ID], %l0
    cas     [lock], %g0, %l0
    tst     %l0
    bne     loop
    nop
out:
    ...     ! Lock held     //SUCCEEDED IN LOCKING
```

F I G. 1 2

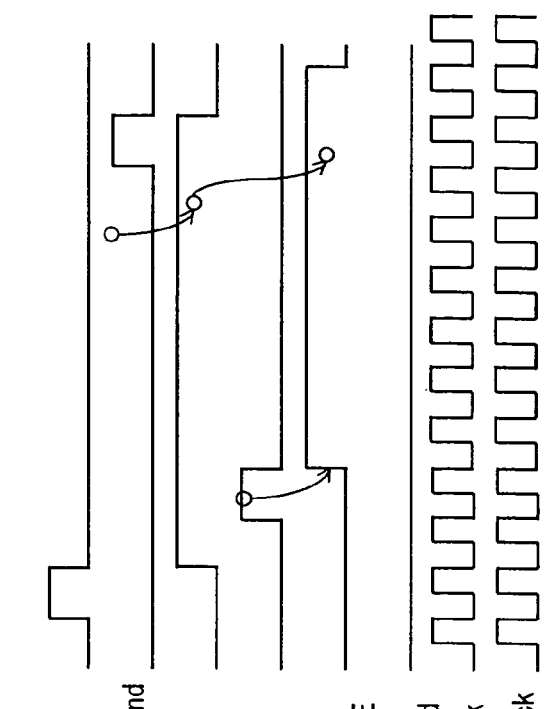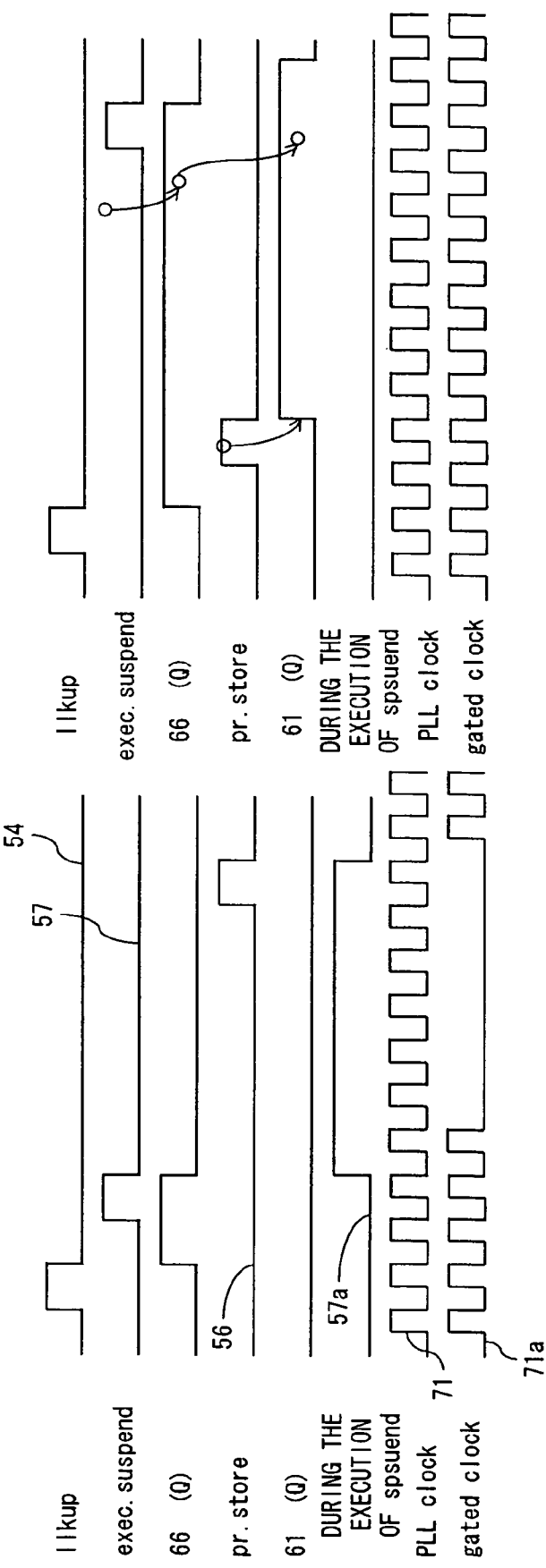

INFORMATION PROCESSING DEVICE, PROCESSOR, PROCESSOR CONTROL METHOD, INFORMATION PROCESSING DEVICE CONTROL METHOD AND CACHE MEMORY

BACKGROUND OF THE INVENTION

1. Field of the Invention

The present invention relates to an information processing technology, and more particularly relates to the instruction processing technology of a system with shared memory, such as a symmetrical multi-processor (SMP) in which a plurality of processors are combined, cc-non-uniform memory architecture (cc-NUMA) and the like.

2. Description of the Related Art

In a shared memory system by a multiprocessor, as a method for securing an exclusive right, a lock method, mutex-lock and the like are known. A spin loop is one of the typical methods for obtaining lock. In this case, a "lock variable" is provided for main memory, and each processor repeats the reference/update trial of the "lock variable" and spin loop (no-load running waiting) in order to secure lock. If lock is obtained, the lock is displayed only during lock. If the lock is released, lock release is displayed. Thus, an exclusive right can be secured among a plurality of processors.

An example of a conventional spin loop instruction string is described below. An address block (4 bytes) indicated by the "lock" of the main memory corresponds to the above-mentioned "lock variable". If the contents are 0, it is indicated that the process is in a lock-release status. If the contents are its own ID (contents of ID to which each process belongs), it is indicated that the process is being locked.

Although in the following example, description is made using a SPARC V9 instruction set, the description is not peculiarly applied to a specific instruction set, but is common to all instruction sets.

As the simplest spin loop, the instruction string shown in FIG. 1 can be used.

In FIG. 1, the function of each instruction is described on its right side as comments. In an instruction string structured as shown in FIG. 1, since in a cas instruction, there is always a possibility that an access to the main memory of another processor (store) may occur, the processor always operates to obtain a cache block exclusive right. In this case, a plurality of processors tries to obtain the same lock variable and competition among a plurality of segments of cache becomes tough, which is a problem.

FIG. 2 shows an example of an instruction string by which this problem is solved. In FIG. 2, the cache is kept in a shared status unless the lock variable is rewritten (as long as a processor that obtained lock maintains the lock). Therefore, there is no above-mentioned cache competition.

In such a configuration, the loop must be always executed and checked. However, since the recent high-speed tendency of processors is faster than the high-speed tendency of memory system, the difference in speed between a processor and a memory system is getting large.

In such a situation, although instruction strings are interpreted and executed by a great number of idle running by a spin loop, substantially no job is made and power is uselessly consumed, which is a problem. More particularly, in a large-scale SMP system, a specific lock variable is often collectively scrambled for. In this case, equipment other than a specific CPU does no useful job, and the power cost of system operation increases, which is a problem.

In a processor core adopting a multi-thread processing method, if this spin loop occurs in a specific thread processing part, idle running due to a spin loop process with no substantial job hinders the progress of other thread processes of the processor core, which is also a problem.

The same problem occurs in other processes using a lock variable, such as barrier synchronization, a processor synchronization process (synchronization waiting), general processor synchronization, I/O synchronization, an idle loop and the like.

As conventional exclusive control and synchronous control technologies in a multi-processor system, Patent References 1, 2 and 3 are known.

Specifically, in Patent Reference 1, a mechanism for realizing exclusive control by storing a shared variable in main memory and collectively monitoring processors on the main memory, is disclosed. In a recent processor with cache memory, rewriting in the cache is not promptly reflected on the main memory. More particularly, in a write-back cache method, it usually takes a fairly long time to reflect rewriting. Since in a recent processor with write-through cache, memory latency is very short and reflection loss is long. Accordingly, performance degrades.

Therefore, as in Patent Reference 1, the above-mentioned spin loop problems cannot be solved simply by collectively monitoring a plurality of segments of main memory. Therefore, a method for solving them within cache memory, which does not affect memory latency, is desired.

In Patent Reference 2, a technology for realizing the exclusive control of shared memory among CPUs by providing an access control signal wire (pin) for the exclusive control among CPUs in addition to a system bus shared by a plurality of the CPUs, is disclosed. Recently, since connection between processors (for example, the number of input/output pins of an LSI) has been costly, the use of one pin as a data line is more effective in performance improvement than the exclusive use of one pin for the purpose of exclusive control. Otherwise, the deletion of even one pin can contribute to the reduction of CPU manufacturing cost more. Therefore, a method for realizing exclusive control among CPUs without increasing the number of pins, is demanded.

In Patent Reference 3, a synchronous control circuit used to control synchronization between a processor and a co-processor, which are in the relationship between a master and a servant, is disclosed. However, it is difficult to apply the circuit to a system in which each processor equally handles shared memory.

Specifically, a processor can voluntarily catch the operation status of a co-processor since the processor is in a position to issue instructions to the co-processor. However, since in an SMP system, each processor does not logically store information about the operation statuses of other processors, it is difficult to apply the technology of Patent Reference 3 in order to solve the above-mentioned problems.

The present invention is made to solve such problems. The present invention can also be applied to a co-processor system.

Patent Reference 1: Japanese Patent Laid-open Application No. 3-164964

Patent Reference 2: Japanese Patent Laid-open Application No. 61-229150

Patent Reference 3: Japanese Patent Laid-open Application No. 2002-41489

SUMMARY OF THE INVENTION

It is an object of the present invention to reduce the waste of power consumption and processor resources due to a spin loop for exclusive control among a plurality of logical and physical processors.

It is another object of the present invention to prevent the performance degradation of other logical processors due to the spin loop of one logical processor in a multi-processor system where one physical processor is provided with a plurality of hardware threads and which can be operated as if there were a plurality of logical processors.

It is another object of the present invention is to realize an exclusive control mechanism in which the rewriting from the existing program can be easily made and to which software can be ported with a low cost.

In the present invention, the above-mentioned problems can be solved by predicting the possibility of the rewriting of a lock variable for the exclusive control of memory access and suspending the processor or thread located in a part where conventionally a spin loop occurs due to release waiting.

Specifically, in the present invention, a processor can be suspended and resumed by providing both a new load instruction to set the monitor start trigger of a memory block, including a memory block to be loaded (hereinafter called "LOAD-WITH-LOOKUP instruction") and a writing detection function to monitor a memory block, and by executing/releasing a suspense instruction, such as a SUSPEND instruction and the like, in accordance with both the LOAD-WITH-LOOKUP instruction and the detection result of the writing detection function, in order to realize the possibility prediction of the rewriting of a lock variable.

BRIEF DESCRIPTION OF THE DRAWINGS

FIG. 1 shows an instruction string in the conventional exclusive control;

FIG. 2 shows an instruction string in the conventional exclusive control;

FIG. 6 shows an example of the function of the information processing device, which is one preferred embodiment of the present invention;

FIG. 7 shows an example of an instruction string to be handled in the control method of the information processing device of the present invention;

FIG. 8 shows an example of an instruction string to be handled in the control method of the information processing device of the present invention;

FIG. 9 shows an example of an instruction string to be handled in the control method of the information processing device of the present invention;

FIG. 10 shows an example of an instruction string to be handled in the control method of the information processing device of the present invention;

FIG. 11 shows an example of an instruction string to be handled in the control method of the information processing device of the present invention;

FIG. 12 shows an instruction string including a use example of a LOAD-WITH-LOOKUP instruction provided for the information processing device of the present invention;

FIGS. 21A and 21B are timing charts showing the operation of the power-saving control unit shown in FIG. 16;

DESCRIPTION OF THE PREFERRED EMBODIMENTS

The preferred embodiments of the present invention are described in detail below with reference to the drawings.

Figure 3A:
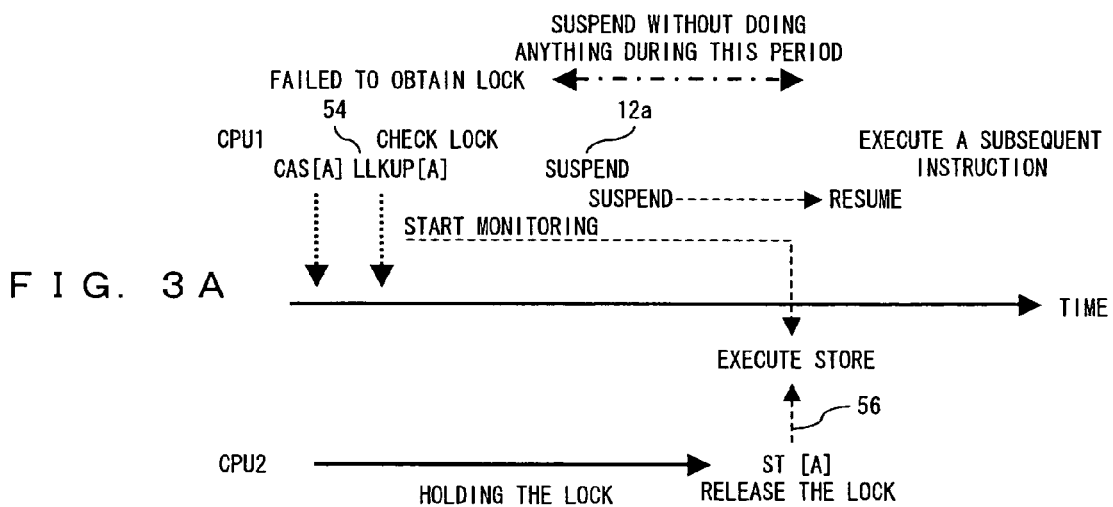
FIGS. 3A and 3B compare the control method of the information processing device with the conventional one.
Figure 3B:
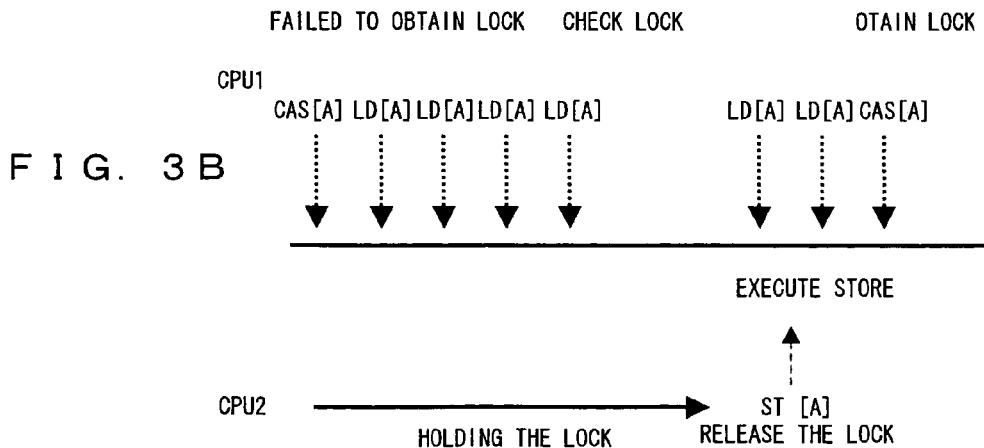

As shown in FIG. 3B, conventionally, when obtaining the lock of a lock variable [A] on a storage device, a useless spin loop repeating LD[A] after the failed acquisition by CAS[A] and checking the change of the lock variable [A] (release from other processors) is executed.

However, in the present invention, as shown in FIG. 3A, a CPU 1 issues a LOAD-WITH-LOOKUP instruction after the failed acquisition by CAS[A] and monitors store to lock variable [A] (possibility of release from another CPU 2). Simultaneously, the CPU 1 is entered into a suspense status by a SUSPEND instruction. Then, the CPU 1 can be restored using the detection of the store possibility of the lock variable [A] by another CPU 2 as a trigger, and the re-acquisition of the lock variable [A] can be attempted. Thus, no useless spin loop occurs.

Figure 4:
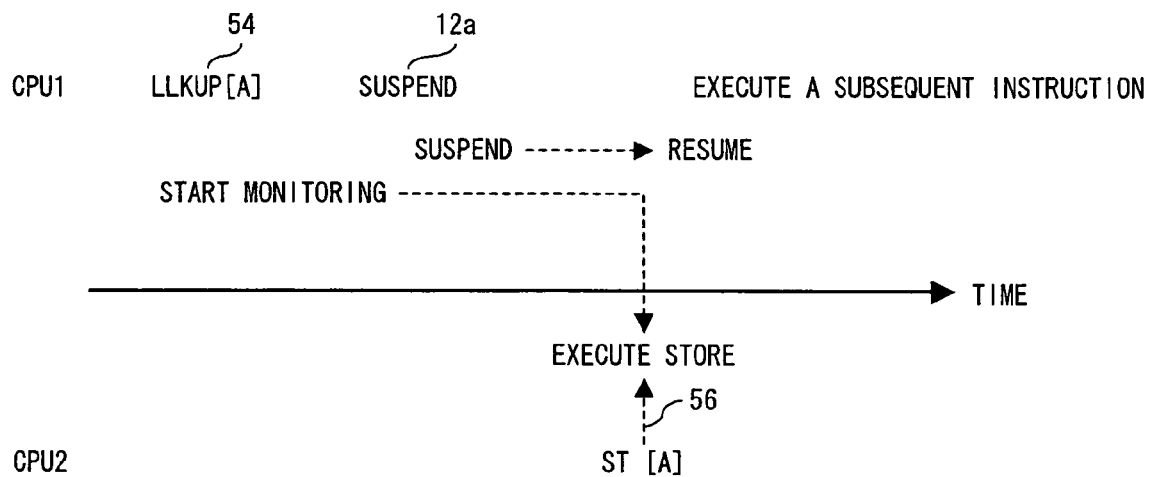
FIG. 4 shows an example of the function of the information processing device, which is one preferred embodiment of the present invention.

Specifically, as shown in FIG. 4, generally the CPU 1 starts monitoring a target lock variable [A] by a LOAD-WITH-LOOKUP instruction and then enters into SUSPENSE (suspense status). If the CPU 1 detects an access for the release of the lock variable [A] by the other CPU 2, the CPU 1 is restored from the suspense status and starts executing a subsequent instruction.

The present invention analyzes the instruction string of the existing program, predicts the generation area of a spin loop and suspends/resumes the processor. Specifically, the present invention executes the step of detecting an instruction string that will become a spin loop used to detect the possibility of rewriting a lock variable from the existing instruction string and the step of suspending the relevant processor or hardware thread instead of the conventional spin loop.

However, since the recent processor is usually provided with cache, it is very difficult to monitor main memory without any process. Therefore, the present invention is provided with a writing detection function to monitor and detect the possibility of rewriting a lock variable in cache memory.

Figure 5:
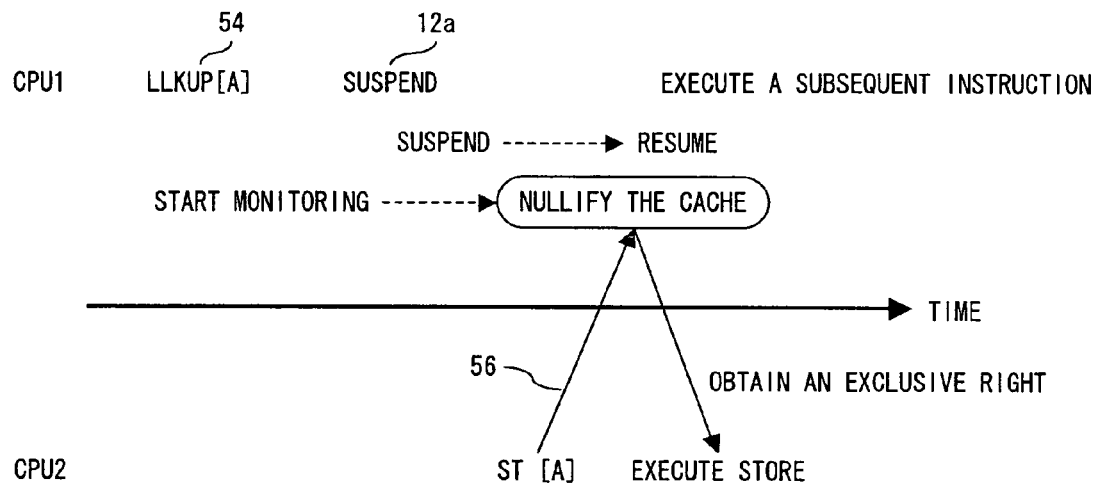
FIG. 5 shows an example of the function of the information processing device, which is one preferred embodiment of the present invention.

In other words, as shown in FIG. 5, in order to detect the possibility of rewriting a lock variable [A], the nullification on the cache memory of the lock variable [A] by the locked CPU 2 is used as a detection trigger, and the CPU 1 is restored from the suspense status.

As shown in FIG. 6, there is a possibility of detecting the nullification (release) on the cache memory of the lock variable [A] before the CPU 1 enters into the suspense status after the issuance of a LOAD-WITH-LOOKUP instruction. In that case, the CPU 1 does not enter into a suspense status and continues to access the lock variable [A] without any process.

The higher the detection accuracy of the possibility of rewriting a lock variable is, the higher the utilization efficiency of a processor becomes. The situation in which detection is not possible although in reality there is rewriting, must be avoided so that there may not be unreasonable hang-up.

Sometimes a suspense method for permitting resumption only by the conventional offering without address monitor, is required. Therefore, it is convenient if this can be selected.

Sometimes an instruction cannot be added to the existing instruction set. Sometimes a program cannot be revised (or it is difficult to revise a program) from old instruction codes. In such cases, no benefit can be obtained by instruction addition. Therefore, a solution method without instruction addition is desired.

Figure 7:
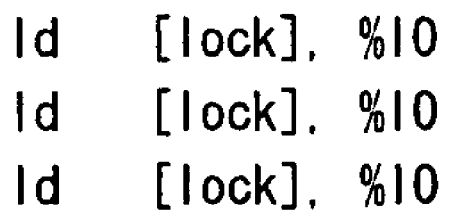

As described above, in a typical lock chain, when lock cannot be secured, a memory access instruction as shown in FIG. 7 can be observed in the execution range of several tens of instructions. Even if it is unlucky, it can be observed as shown in FIG. 8.

Alternatively, in the example shown in Appendix J.6 of SPARC-V9 Manual, a method in which a try routine and a loop routine are reversely arranged (if a trial fails, first of all a loop is executed) is introduced. In this case, it can be observed as shown in FIG. 9.

Figure 10:
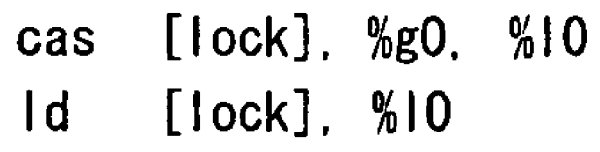

A common fact is that if two instructions accessing the same address is issued closely, as shown in FIG. 10, when lock acquisition fails, the processor falls into a spin loop. In other words, if there are a function to detect the approach of these two instructions, a function to suspend the instruction when detecting it and a function to start monitoring at the time point of cas and to recognize the rewriting by another system, a method for solving the conventional problems in which LOAD-WITH-LOOKUP and SUSPEND instructions are almost combined, can be obtained.

Figure 11:
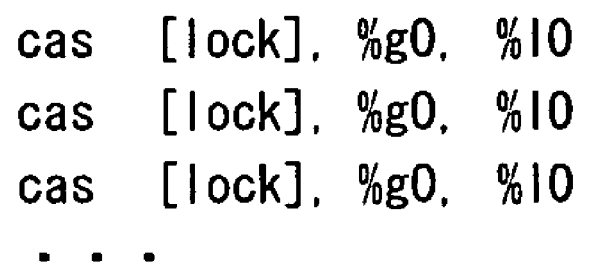

A basic example is shown in FIG. 11. However, it can also be applied to a series of cas instructions to the same address. Alternatively, it can also be applied to a series of ld instructions to the same address.

There can be a case where such a hardware supplementary mechanism operates as unexpected (for example, there is a possibility that it may be mistaken for a spin loop since even a semaphore mechanism uses cas). Therefore, even an expected operation must be prevented in order to remove an unexpected operation or reduce its frequency.

In order to truly improve it, it is preferable to add a LOAD-WITH-LOOKUP instruction and to explicitly designate it using an additional instruction. In other words, although both a method for adding a LOAD-WITH-LOOKUP instruction and a method for analyzing the existing instruction string can be improved, it is the best to combine them.

The conventional spin loop problem can be improved by using the LOAD-WITH-LOOKUP (llkup) instruction of the present invention. One of the improvement methods is shown in FIG. 12. Specifically, firstly, a lock variable [lock] is loaded onto a register % 10 by an llkup instruction, and simultaneously the monitor of store possibility of the lock variable [lock] is started. Then, the contents of the register % 10 are evaluated by a tst instruction. If the contents are not 0 (another processor obtains its exclusive right), the execution point attempts to be branched to loop. However, since an SUSPEND instruction that is restored by the detection of store possibility to the lock variable [lock] is executed, immediately the processor enters into a waiting status, and the processor attempts to access the lock variable [lock] again by a cas instruction or the like using the detection of the store possibility as a trigger. Thus, the processor can wait to obtain the lock variable [lock] without falling into a spin loop.

As described above, the fact that the rewriting frequency of the existing codes is very few is also one of the great advantages of the present invention.

Figure 13:
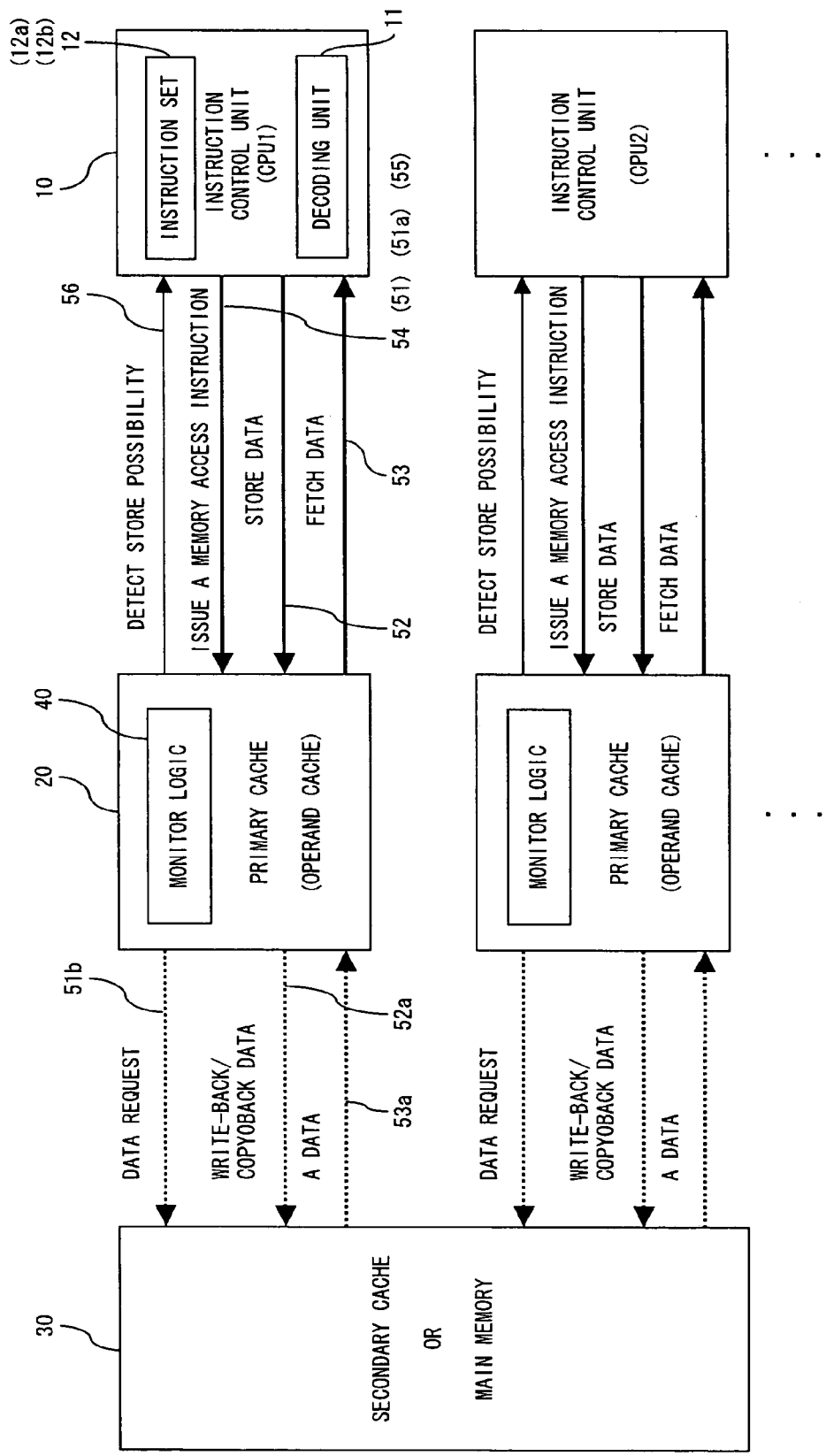
FIG. 13 conceptually shows a configuration of the information processing device executing the control method of the information processing device, which is one preferred embodiment of the present invention.

FIG. 13 conceptually shows a configuration of the information processing device executing the control method of the information processing device, which is one preferred embodiment of the present invention.

The information processing device of the preferred embodiment comprises a plurality of instruction control units 10, a storage device 30 storing data accessed by these instruction control units and cache memory 20 which is inserted between this storage device 30 and each instruction control unit 10, temporarily storing data to be transmitted/received between them and capable of accessing data faster than the storage device 30.

Specifically, both the cache memory 20, such as (primary operand) cache and the like, and the storage device 30 as the lower-order memory of the secondary cache, main memory or the like are connected to the instruction control unit 10 as followers. The storage device 30 is shared by the plurality of instruction control units 10.

In this case, each instruction control unit 10 is in charge of the interpretation/execution of instructions and operation. Each instruction control unit 10 comprises a register. Each instruction control unit 10 also issues a memory access instruction 51 and an address 51*a* to the cache memory 20, outputs store data 52 to be stored to the storage device 30 and inputs fetch data 53 read from the storage-device 30 through the cache memory 20.

Information, such as a data request 51*b* issued from the cache memory 20 to the storage device 30, write-back/copy-back data 52*a* used to reflect data in the cache memory of the storage device 30, data 53*a* read into the cache memory 20 from the storage device 30 and the like, are transmitted/received between the cache memory 20 and the storage device 30.

This preferred embodiment further comprises a control interface, such as a LOAD-WITH-LOOPUP instruction 54 (hereinafter called "llkup instruction 54"), which is described later, a nullify request 55 to designate the nullification of specific data in the cache memory 20 and the like, as an memory access instruction 51.

In other words, the instruction set 12 of the instruction control unit 10 of this preferred embodiment includes an llkup instruction 54. The instruction set 12 also includes a specific SUSPEND instruction 12a to restore the processor from the suspense status using the detection of a store possibility detection signal 56, which is described later, and a regular SUSPEND instruction 12b to permit its resumption by the conventional offering, which are properly used as requested.

Figure 14:
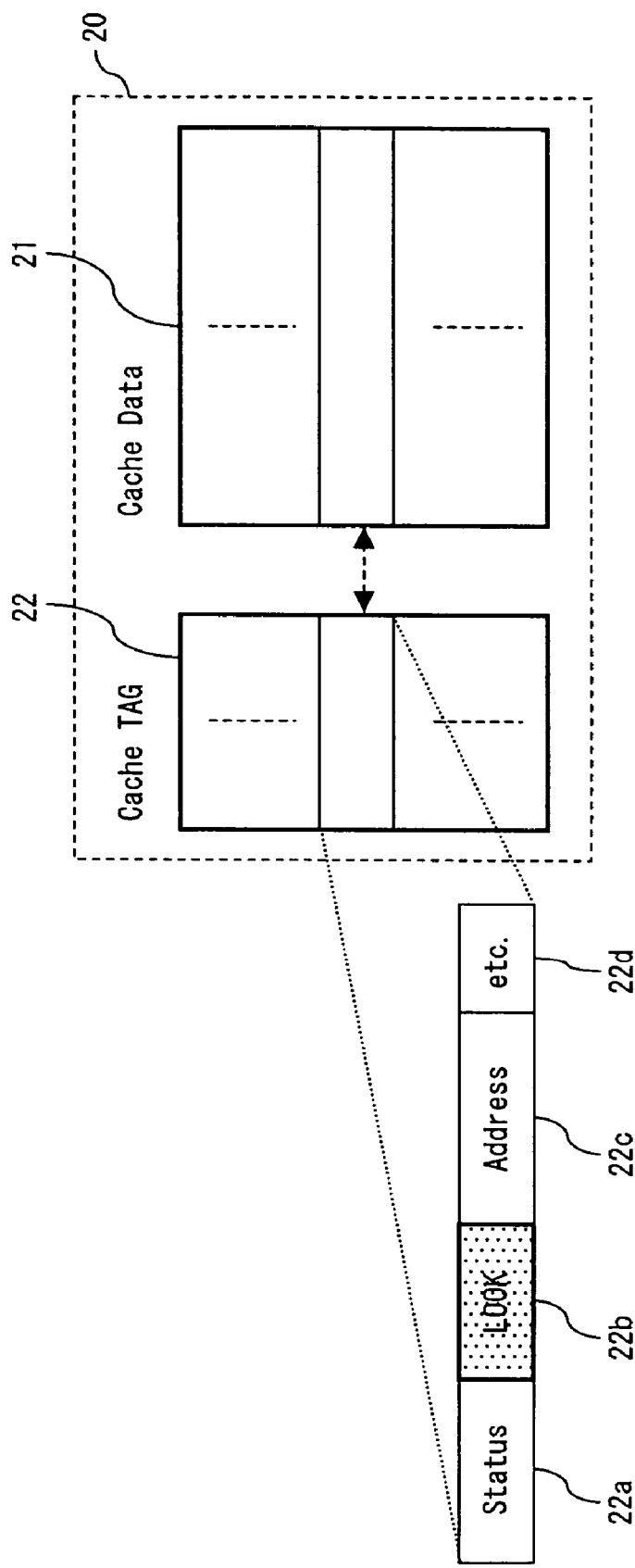
FIG. 14 conceptually shows in detail a part of the configuration of the information processing device shown in FIG. 13, as an example.

As shown in FIG. 14, the cache memory 20 comprises a cache data unit 21 temporarily storing data to be transmitted/received between the instruction control unit 10 and the storage device 30, for example, in units of lines or the like, and a cache tag unit managing data stored in this cache data unit 21. In the cache tag unit 22, a status 22a, an address 22c of the storage device 30, other management information 22d are set for each data storage unit, such as a line in the cache data unit 21.

Furthermore, in this preferred embodiment, the cache memory 20 comprises store monitoring logic 40. This store monitoring logic 40 monitors whether data in the cache memory 20, corresponding to the access area of the storage device 30, of the relevant llkup instruction 54 is rewritten by another instruction control unit 10 different from the instruction control unit 10 that issued the relevant llkup instruction 54, and transmits a store possibility detection signal 56 to the instruction control unit 10 in response to it.

In this preferred embodiment, the operand cache part of the cache memory 20, such as a primary cache and the like, is important, and it can handle the target memory access of a load instruction (fetch instruction) and the like, regardless of which the cache configuration is, unified or separate, that is, whether or not instruction cache and operand cache (data cache) are separated. Although the cache memory 20 can be write-back (store-in) cache or write-through (store-through) cache, here the description is made assuming that the cache memory 20 is write-back cache.

The operation principle of this preferred embodiment is described below. In a shared memory system, such as SMP, cc-NUMA or the like, store order is restricted so that there will be no inconvenience when handling shared memory among processors (instruction control units 10), and cache coherency is also maintained.

As to store order, there are order provisions called "TSO" in SPARC V9 of Sun Micro-System Corporation (although there are other order provisions, in reality only this is used). In short, in store provisions, a processor is specified to move so that other observers may observe it in stored order (although it is not limited to that).

If cache coherency is maintained in this status, a processor which performs store when the store should be performed must obtain an exclusive right to the memory area to be stored (it can also be called "writing right", that is, a status where no other processor than the processor has its memory area on the cache. Therefore, when storing, the store provisions can be observed).

As the status 22a of the cache tag unit 22, a configuration in which cache statuses, such as MCI (modified, clean and invalid), MESI (modified, exclusive, sharable and invalid), MOEDI (modified, owned, exclusive, sharable and invalid) and the like, are stored, is known. Essentially, there are three statuses; "shared (C) (equivalent to no exclusive right since only the relevant processor may share it)", "monopolized (M)" and "invalid (I)", and MESI and MOSEI are obtained simply by adding an auxiliary status to each of them, which are described later with reference to MCI. As to MESI and MOESI, E and M are statuses having an exclusive right, and O and S are shared statuses. Therefore, they can be similarly handled.

In order to maintain cache coherency, the cache memory 20 of the execution processor obtains an exclusive right to the relevant memory area when performing store. When the exclusive right is obtained, the corresponding memory areas of other processors enter into "invalid" statuses.

Therefore, when there is memory rewriting (store), the storing right to the relevant memory area is released (nullified) in cache memory 20 other than one to be rewritten if it has the memory area. In this preferred embodiment, access to the relevant lock variable in exclusive control by the update of data, such as a lock variable or the like, set in a storage device 30 shared by a plurality of instruction control units 10 is controlled utilizing the control mechanism of this cache memory 20.

Specifically, a llkup instruction 54 (LOAD-WITH-LOOKUP instruction 54) is newly set between an instruction control unit 10 and cache memory 20 as described above, according to the basic control principle of this cache memory. Then, if this llkup instruction 54 is executed, the following control operations are performed.

(1) Data is loaded onto a designated memory area.
(2) The data is registered in its own cache memory 20 accompanying item (1) above (usually shared (C)).
(3) The store monitoring logic 49 monitors this memory area, and also the instruction control unit 10 executes a special SUSPEND instruction 12a to enter into a suspense status.
(4) If a memory area designated by the llkup instruction 54 cannot be held for some reason, it is regarded that there is a store possibility and a store possibility detection signal 56 is returned to an instruction control unit 10 that issued the llkup instruction 54.
(5) The instruction control unit 10 is restored from the suspense status using the reception of this store possibility detection signal 56 as a trigger.

The monitoring of a memory area by the store monitoring logic 40 can be realized on a cache tag or a register.

A method for realizing it on a cache tag is shown in FIG. 14. As described above, usually, the cache tag unit 22 is paired with data, and includes a cache status (one of the above-mentioned M, C, I, etc.) indicated by a status 22a, an address 22c and other management information 22d (privilege flag, context, etc.). LOOK flag information is provided here. Specifically, in this preferred embodiment, the cache tag unit 22 is provided with a LOOK flag 22b for the llkup instruction 54 for each data storage unit.

At the time of cache registration usually generated when executing a regular load, this LOOK flag 22b is not set. If the llkup instruction 54 is executed, the following load process is performed accompanying the registration the llkup instruction 54.

(1) If corresponding data is stored in the cache data unit 21, the LOOK flag 22b of the relevant line of the cache tag unit 22 is set.
(2) If corresponding data is not stored in the cache data unit 21, the LOOK flag 22b of the relevant line is set in the cache tag unit 22 when registering the data of the relevant line.

The store possibility of other processors is determined by the nullification of a cache line in which this LOOK flag 22b is set. It is generally determined by the following events.

(1) A cache line becomes a replacement target.
(2) A nullify request comes from another processor than the relevant processor by an obtain request for an exclusive right from another processor or the like. Since nullification equals to entry of a cache status (status 22a) from M or C (in another cache status indication method, S, O, E are also possible; in any way, from all storing statuses) to I, the rewriting of the cache tag unit 22 is limited to the above-mentioned cases. At this moment, the store monitoring logic 40 checks the LOOK flag 22b. If the flag is set, it means a monitor status. Since this is the detection target of store possibility, it is regarded that store possibility was detected, and a store possibility detection signal is returned to the instruction control unit 10 that issued the llkup instruction 54.

The cache method includes several methods, such as a write-through/write-back method in store management, an association method (set associative method for cache hit rate improvement), an address management method (virtually indexed physically tagged (VIPT), physically indexed physically tagged (PIPT)) and the like. However, in the present invention, their different combination can also be similarly realized without bad influences.

Figure 15:
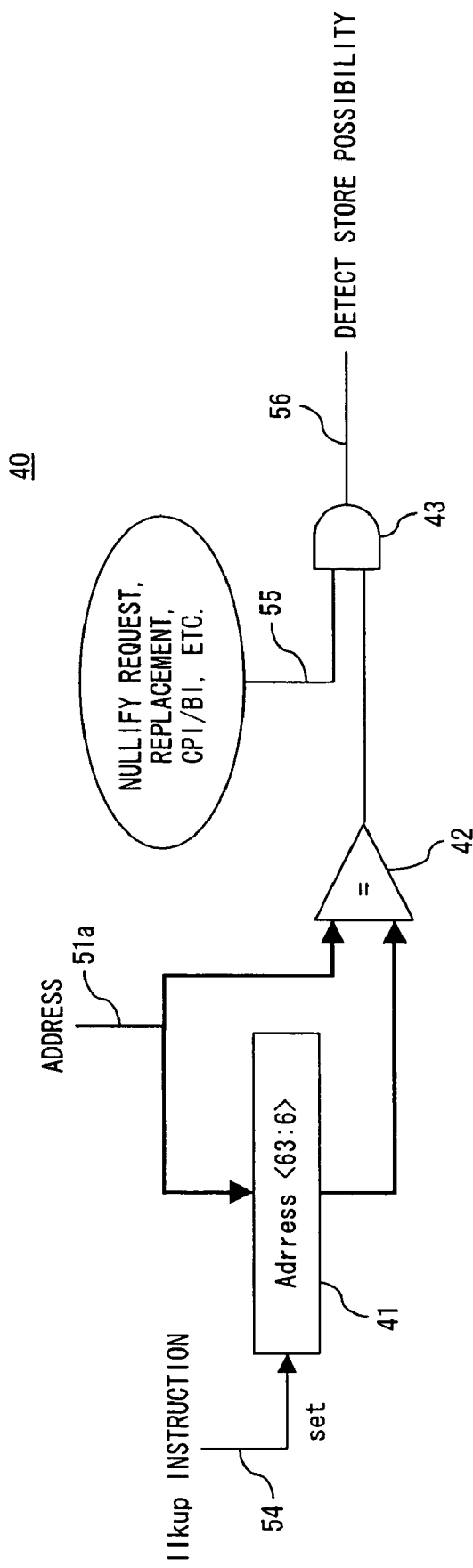
FIG. 15 is the circuit diagram showing a configuration of a store monitor logic provided for the information processing device shown in FIG. 13.
Figure 16:
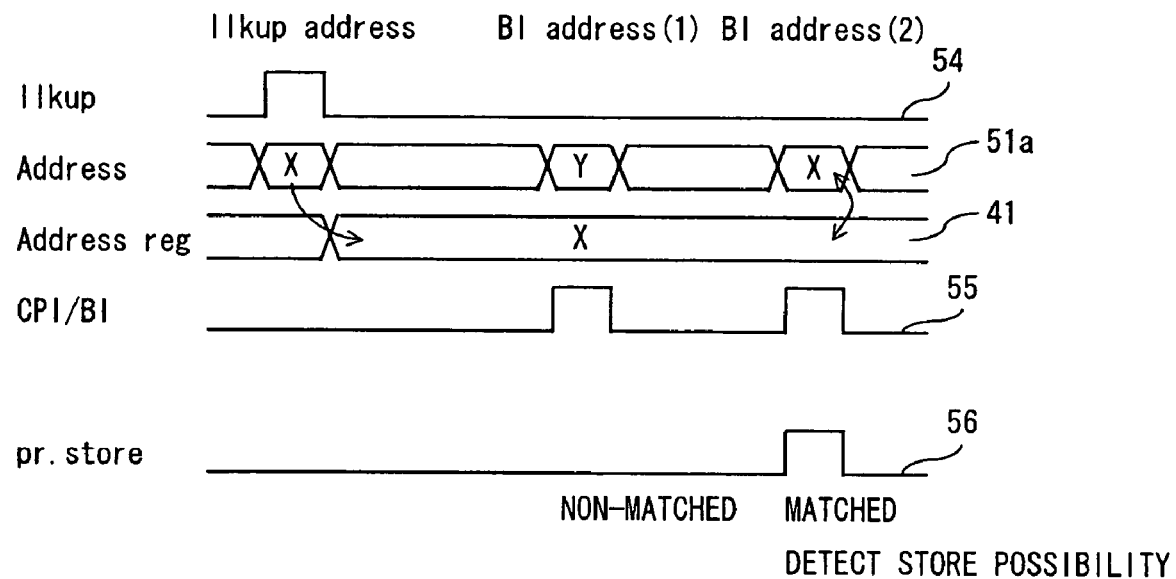
FIG. 16 is a timing chart showing the function of the store monitor logic shown in FIG. 15.

The circuit configuration in which a register realizes the store monitoring logic 40 and the timing chart of its operation are shown in FIGS. 15 and 16, respectively. Specifically, a register 41 is provided instead of providing the cache tag unit 22 with a LOOK flag 22b, and an address 51a is set by executing the llkup instruction 54. When cache nullification is performed by a nullify request 55, the address is compared with the contents of the set register 41 by a comparator 42, and the output of the AND by a logic control circuit 43, of a comparison result outputted from the comparator 42 and the nullification request 55, is returned to the instruction control unit 10 as a store possibility detection signal 56.

By combining the issuance of a llkup instruction 54 and the return of a store possibility detection signal 56 thus, the spin loop of the instruction control unit 10 can be avoided in exclusive control by the reference/update of a shared variable (lock variable) in the storage device 30.

More accurately, an address range can also be set in the register 41. For example, if a target fetch size is an llkup instruction 54 of four bytes, it can be recorded that the designated address is four bytes. If a plurality of llkup instructions 54 is executed, the range can be recorded.

In this example, a cache line size is used for the range, for convenience' sake. Even if a cache line size is four-byte fetch, its target address range is regarded to be 64 bytes (there is no problem at all if cache is not shared by a plurality of processors. More particularly it is in a case where the cache is shared by a plurality of processors that a small address range has a meaning).

Figure 17:
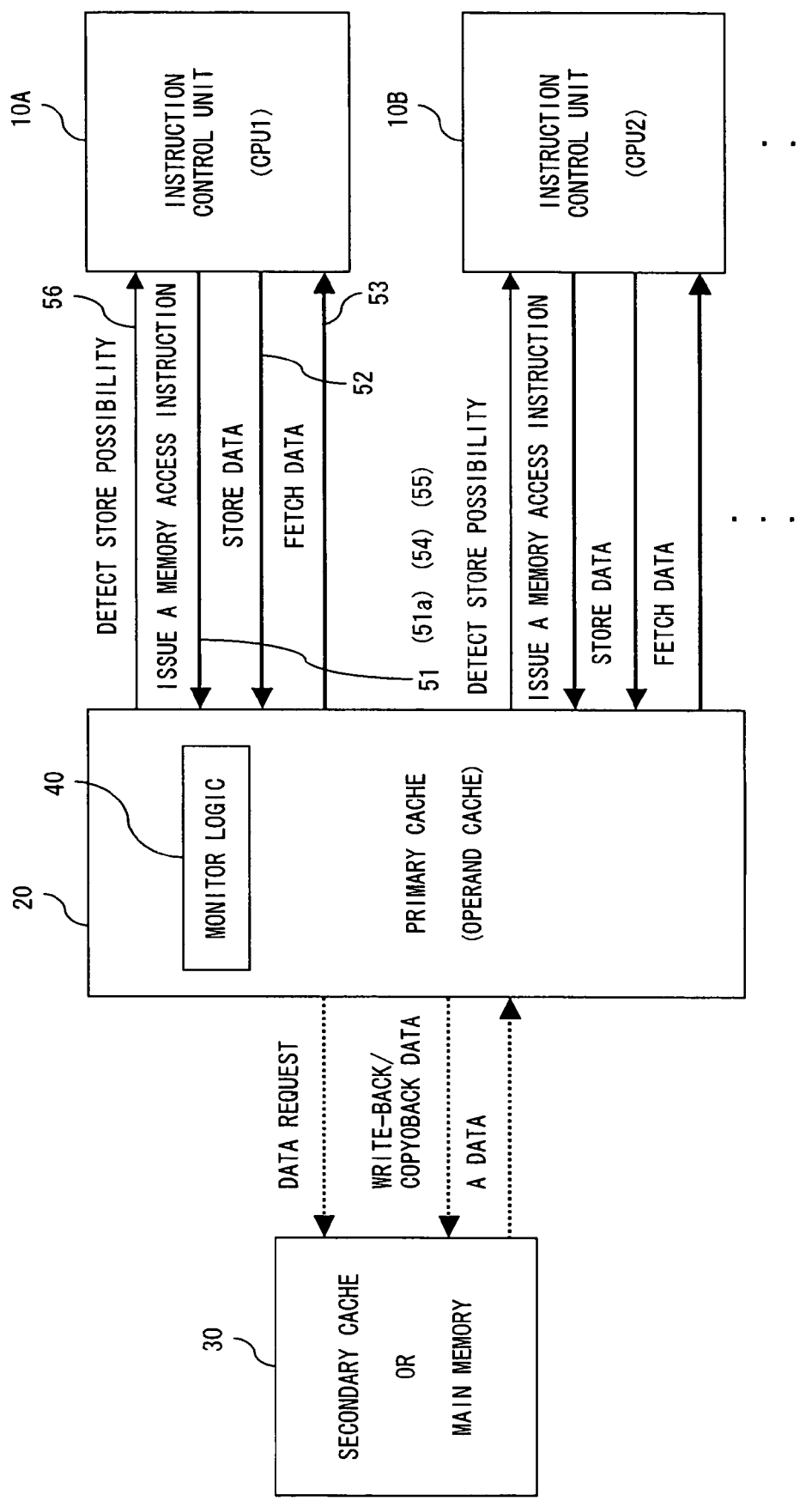
FIG. 17 conceptually shows a variation of the information processing device, which is one preferred embodiment of the present invention.

As shown in FIG. 17, a method in which an address range of four bytes can be used, such as a global buffer storage (GBS) method, a chip multi-processor (CMP) method and a hardware multi-thread method (a processor that executes one hardware thread in this case is called "logical processor") has an important meaning in a configuration such that one segment of cache memory 20 can be shared by a plurality of (logical) processors (instruction control units 10A and 10B). If an address range is used, address range determination by store executed by a shared logical processor is added to address matching determination accompanying the above-mentioned nullification. There is not always a need to limit the range, and it can also be address matching determination by a cache line. The difference is whether highly accurate determination is required or easy possibility determination is sufficient, which is also a trade-off with cost.

Figure 18:
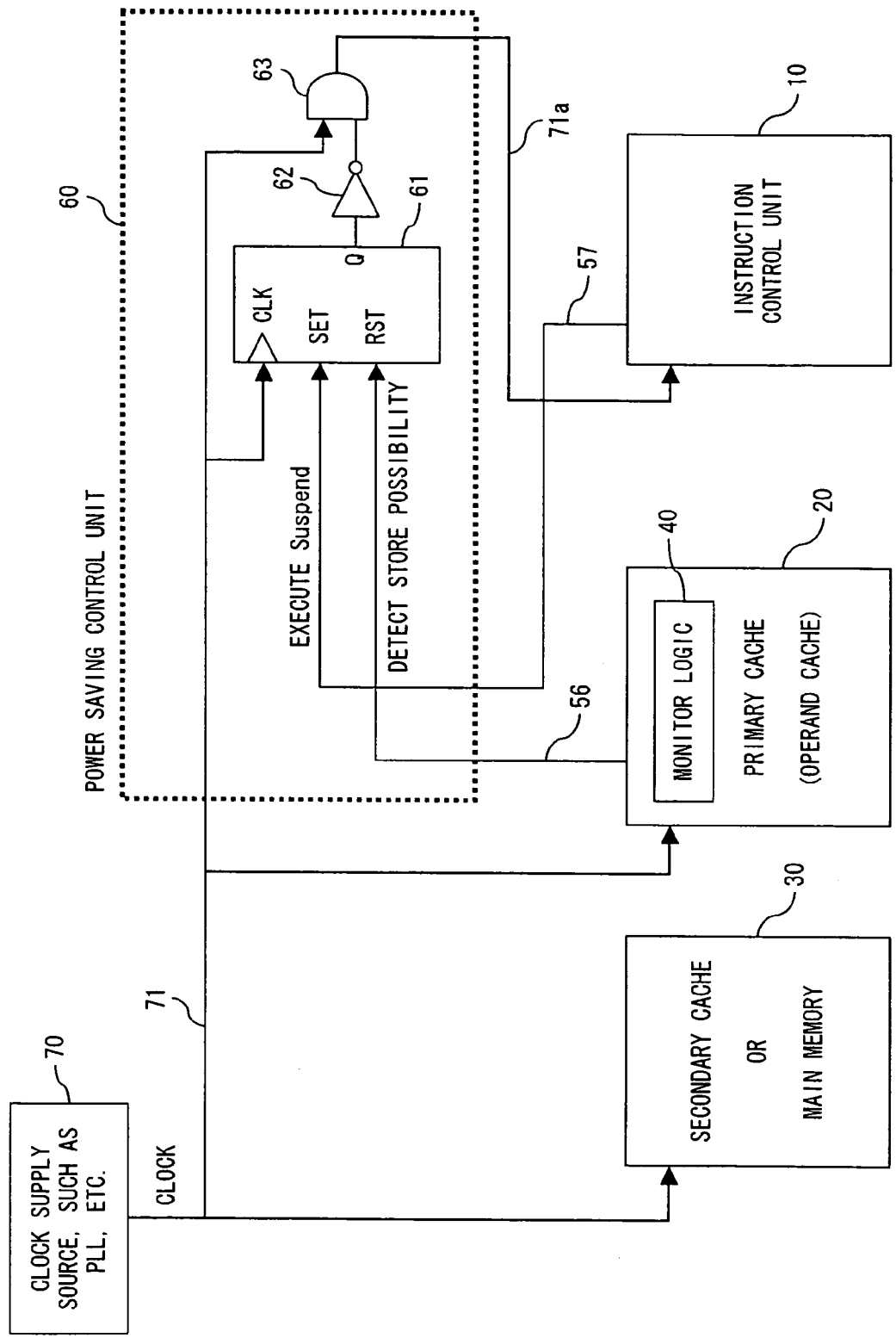
FIG. 18 is a circuit diagram showing a configuration of a power-saving control unit provided for the information processing device, which is one preferred embodiment of the present invention of the present invention.

An example of restoration (resumption) from suspense by using a store possibility detection means, such as the above-mentioned store monitoring logic 40, LOOK flag 22b or the like, is described below. A simple method for first of all entering a processor into a suspense status is to generate a SUSPEND instruction to instruct the processor to enter into a suspense status and to execute the instruction. Namely, if there is an instruction, suspense can be realized by interpreting and executing the instruction. Typically, the clock control system (power-saving control unit 60) is configured as shown in FIG. 18, and is operated according to the timing chart shown in FIG. 19.

Specifically, in a clock control system for supplying an operation clock 71 to the instruction control unit 10, cache memory 20 and storage device 30 from a clock supply source 70, a power-saving control unit 60 is inserted in the supply route of the operation clock 71 to the instruction control unit 10. This power-saving control unit 60 comprises a flip-flop circuit 61 using a suspense execution signal 57 from the instruction control unit 10 and a store possibility detection signal 56 from the store monitoring logic 40 of the cache memory 230 as set input (SET) and reset input (RESET), respectively, and an AND circuit 63 generating an operation clock 71a by the AND of a signal obtained logically inverting the Q output of the flip-flop circuit 61 by a logic inversion circuit 62, and the operation clock 71, and inputting the clock to the instruction control unit 10.

Figure 19:
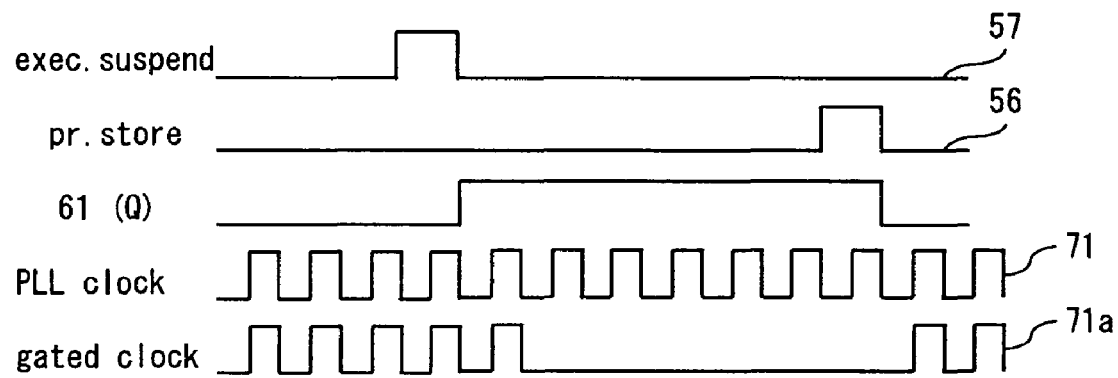
FIG. 19 is a timing chart showing the operation of the power-saving control unit shown in FIG. 18.

Thus, as shown in the timing chart of FIG. 19, the clock supply of the execution control unit can be suspended at the time of suspense, and the clock supply can be resumed at the time of the detection of store possibility. Alternatively, the existing suspense/resumption methods can be combined.

Since the order of the execution of a SUSPEND instruction and the store possibility detection signal 56 is not guaranteed, the following execution order can be expected (FIG. 5).

1. Execution of an llkup instruction through monitor start
2. Execution of a SUSPEND instruction
3. Detection of store possibility However, in reality, there is a possibility that the order is reversed (FIG. 6) as follows.

Figure 20:
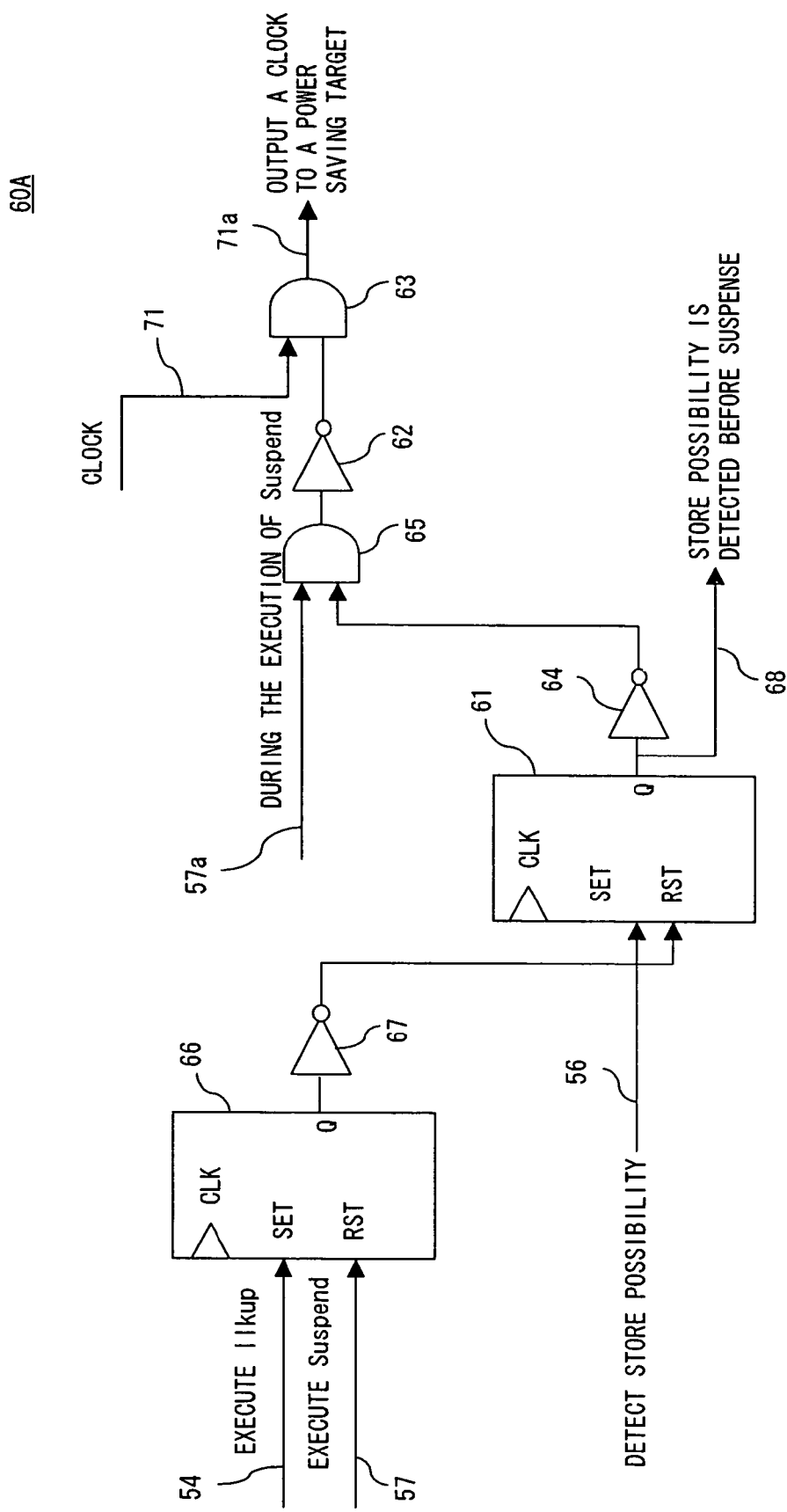
FIG. 20 is the circuit diagram of a variation of the power-saving control unit provided for the information processing device, which is one preferred embodiment of the present invention.

1. Execution of an llkup instruction through monitor start
2. Detection of store possibility
3. Execution of a SUSPEND instruction More particularly, the larger the set number of monitor targets is, the higher the reverse possibility becomes. Therefore, control which takes this into consideration is needed. The power-saving control unit 60A shown in FIG. 20 and the timing chart shown in FIG. 21 realize this.

In the power-saving control unit 60A, both a flip-flop circuit 66 using the execution signal of the llkup instruction 54 as the suspense execution signal 57 as set input (SET) and reset input (RESET), respectively, and a logic inversion circuit 67 inverting the Q output of the flip-flop circuit 66 are disposed in the reset input route of the flip-flop circuit 61 shown in FIG. 18. Furthermore, both a logic inversion circuit 64 inverting the Q output of the flip-flop circuit 61 and an AND circuit 65 calculating the AND of the output of the logic inversion circuit 64 and a suspense during-execution signal 57a which always becomes true during suspense execution are inserted between the flip-flop circuit 61 and logic inversion circuit 62.

Thus, if a store possibility detection signal 56 is regularly detected after suspense execution as shown in FIG. 21A, the input of the operation clock 71a to the instruction control unit 10 is suspended during suspense execution. However, if a store possibility detection signal 56 is detected before suspense execution as shown in FIG. 21B, the input of the operation clock 71*a* to the instruction control unit 10 is not suspended during suspense execution and the instruction control unit 10 continues to operate.

In the power-saving control unit 60A, the Q output of the flip-flop circuit 61 can be used as an early store detection signal 68 for detecting that a store possibility detection signal 56 was detected before suspense execution, as requested.

As described above, the useless power consumption due to the idle-running waiting of the instruction control unit 10, such as the conventional spin loop, can be avoided by monitoring the change of a shared variable for exclusive control due to the access of another instruction control unit 10, using the issuance of an llkup instruction 54 as a trigger, and also entering the instruction control unit 10 into a suspense (operation clock suspense) status by a special suspend instruction 12*a* and restoring the instruction control unit 10 using the input to the power-saving control unit 60 of a store possibility detection signal 56 as a trigger, if the change of the shared variable is anticipated.

So far the effects of this preferred embodiment have been described from the viewpoint of power saving. However, in a configuration where a plurality of logical processors is mounted on one physical chip, the idle-running waiting of each logical processor means the suspense of other processors sharing the hardware. Therefore, the application of the technology of this preferred embodiment, for precisely suspending a processor that falls into an idle-running waiting status can contribute not only to power saving but also to the effective utilization of the throughput (resources) of each logical processor.

In other words, if the present invention is applied to a processor corresponding to a hardware multi-thread, improving throughput by pretending as if a plurality of logical processors were mounted on one physical chip, not only power saving but also the effective utilization of processor throughput (processor resources) can be realized.

For example, although in a vertical multi-thread (VMT) method, a thread process is time-divisionally performed, in this preferred embodiment, a thread (logical processor) is suspended instead of idle-running waiting for exclusive control. Therefore, when the thread is suspended, its instruction processing can be suspended and another thread process can be performed with priority. This also applies to a simultaneous multi-thread (SMT) method.

The realization of a similar function by detecting a spin loop or the like without an llkup/suspend instruction or without using the instruction is described below. A similar function can be realized by operating a processor according to the result of spin-loop detection, instead of setting a LOOK flag 22*b* by an llkup instruction 54 as described above. Therefore, description is omitted after flag setting.

Figure 22:
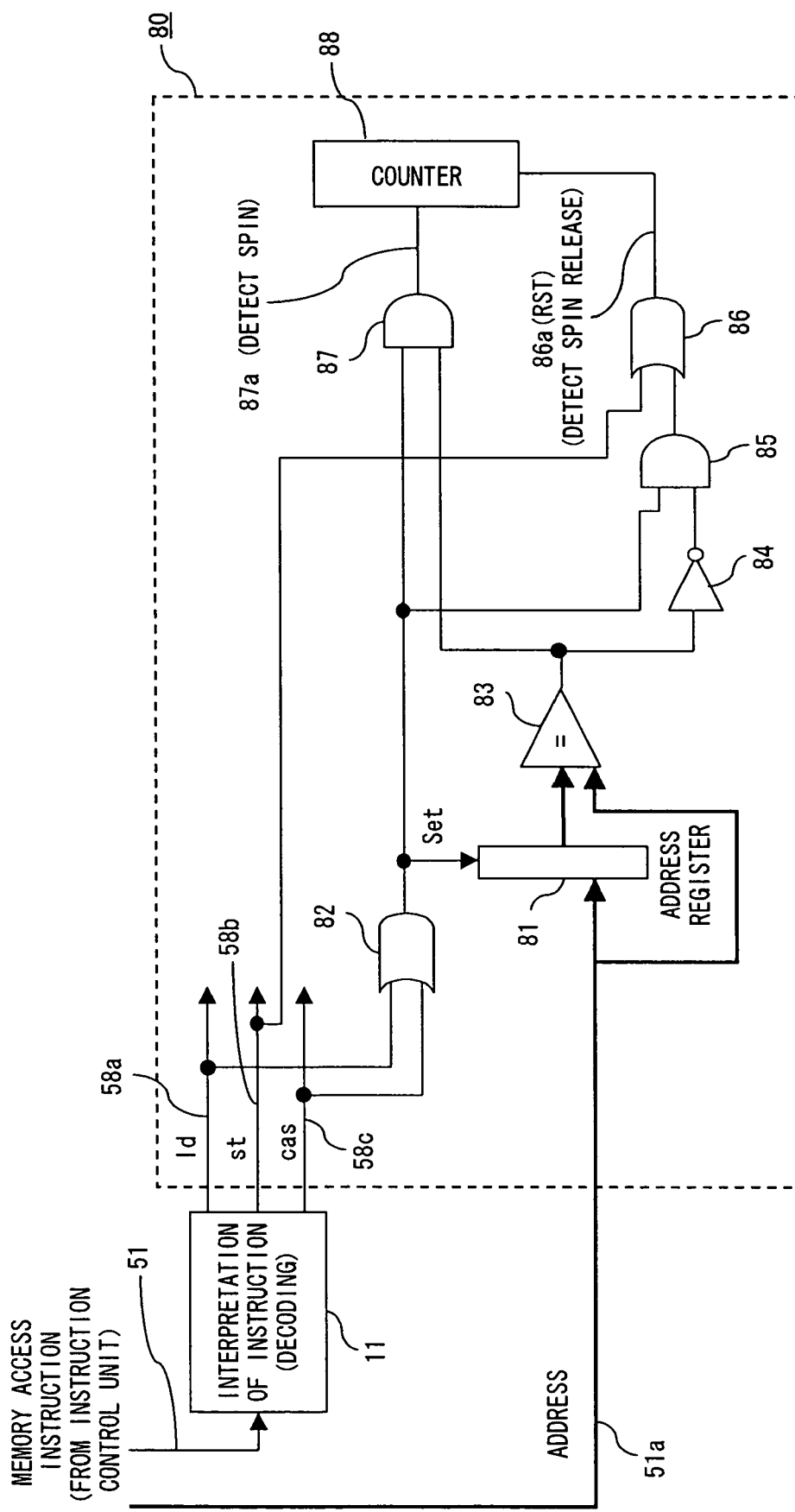
FIG. 22 is a circuit diagram showing a configuration of a spin loop discrimination unit provided for the information processing device, which is one preferred embodiment of the present invention.

As to how to detect a spin loop, as described above in FIGS. 7 through 9, cache access (instruction string) which is characteristic of a status that easily falls into a spin loop is detected. The features are shown in FIGS. 7 through 9, and an example of a spin loop discrimination unit 80 catching the features is shown in FIG. 22.

Specifically, the spin loop discrimination unit 80 comprises a register 81 storing an address 51*a* accompanying a memory access instruction 51, an OR circuit 82 calculating the OR of a load instruction detection signal 58*a* outputted from the decoding unit 11 of the instruction control unit 10 and a compare/swap instruction detection signal 58*c*, a comparator 83 comparing the stored contents of the register 81 with the address 51*a*, an AND circuit 87 calculating the AND of the output of the comparator 83 and the output of the OR circuit 82 and outputting the AND as a spin detection signal 87*a*, a logic inversion circuit 84 inverting the output of the comparator 83, an AND circuit 85 calculating the AND of the output of the logic inversion circuit 84 and the output of the OR circuit 82, an OR circuit 86 calculating the OR of the output of the AND circuit 85 and the store instruction detection signal 58*b* of the decoding unit 11 and outputting the OR as a spin release signal 86*a*, and a counter 88 which is counted up by the spin detection signal 87*a* and is reset by the spin release signal 86*a*.

Figure 23:
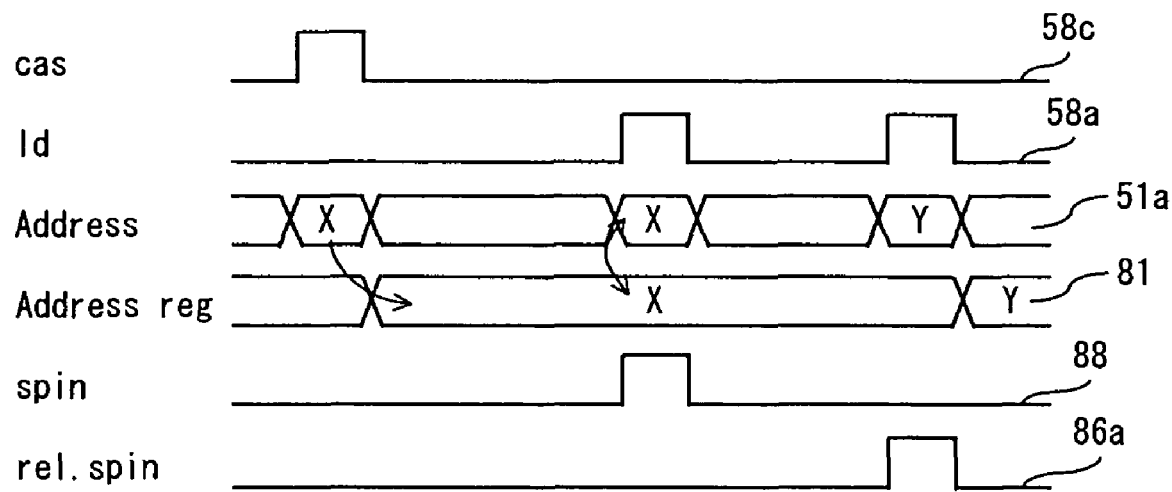
FIG. 23 is a timing chart showing the operation of the spin loop discrimination unit shown in FIG. 22.

Then, according to the timing chart shown in FIG. 23, the address 51*a* is taken in the register 81 when a compare/swap instruction detection signal 58*c* is detected. Then, if the contents of the register 81 coincide with the address 51*a* accompanying the load instruction when the load instruction detection signal 58*a* is detected, the spin detection signal 87*a* is outputted. If the address 51*a* does not coincide with the contents of the register 81 at the time of the detection of the store instruction detection signal 58*b* or at the time of the detection of the load instruction detection signal 58*a* or a compare/swap instruction detection signal 58*c*, the spin release signal 86*a* is outputted.

Then, the counter 88 is counted up by the spin detection signal 87*a*, and if the count reaches a specific value (1 acceptable), the then ld/cas instruction is regarded to be equivalent to an llkup instruction. If the counting continues and the count exceeds the specific value, the processor is suspended after the then ld/cas instruction is completed. If the spin release signal 86*a* is detected, mis-detection can be suppressed by resetting the counter 88. Once the processor is suspended, the counter 88 is reset. Otherwise, when restoring from the suspense, the processor promptly enters into the next suspense status.

By providing such a spin loop discrimination unit 80, a spin loop can be detected regardless of whether or not an llkup instruction 54 is mounted. Power saving can also controlled regardless of whether or not there is a suspend instruction.

As described above, according to the preferred embodiment of the present invention, the bad influence on other thread processes of a processor core can be eliminated by removing the useless idle running of a spin loop. By suspending a processor while waiting for lock acquisition and reducing the useless operation, such as idle-running waiting and the like, both power cost and operation cost can be suppressed. Furthermore, when porting software to a processor provided with a LOAD-WITH-LOOKUP instruction, a program written in the existing instruction codes can be easily rewritten, and accordingly the porting cost of software can be suppressed.

In other words, the wasteful operation cost of a processor can be suppressed, and performance can be remarkably improved. Since the present invention can be applied to any information processing device, its applicable scope is wide. Furthermore, a program written in the existing instruction codes can be easily rewritten by a LOAD-WITH-LOOKUP instruction, which is useful.

According to the present invention, the waste of both power consumption and processor resources which are due to a spin loop for exclusive control among a plurality of logical or physical processors can be reduced.

In a multi-processor system in which one physical processor core is provided with a plurality of hardware threads and which can operate as if it were provided with a plurality of logical processors, the performance degradation of other logical processors due to the spin loop of one logical processor can also be prevented.

In the multi-processor system, since the existing program can be easily rewritten, an exclusive control mechanism with the low porting cost of software can be realized.

The present invention is expressed as follows from a different viewpoint.

Note 1:

A method and architecture for monitoring memory blocks including a memory block to be loaded in an instruction set architecture having a load instruction to read a value from main memory mounted on an information processing device with cache memory.

Note 2:

A method and architecture with a load instruction (LOAD-WITH-LOOKUP instruction) with a function to monitor memory blocks including a memory block to be loaded.

Note 3:

A process method and an information processing device with a means for detecting store possibility (of other logical processors, I/O devices and the like) in the memory block monitoring range set forth in note 2.

Note 4:

A method and a device for providing the detection means, more particularly a cache tag, set forth in note 3, with a flag indicating a during-monitor status and monitoring a cache line with the flag.

Note 5:

A method and a device for providing the detection means, more particularly one or more registers, setting a monitor address and monitoring by checking an address range, based on this set address.

Note 6:

A process method and a device with cache memory for storing the data of an address to be monitored by the cache as the detection means set forth in note 3, in the cache, and determining store possibility when receiving a cache line nullify instruction (Buffer Invalidate or Copy-back and invalidate).

Note 7:

A process method and a device with cache memory for storing the data of an address to be monitored by the cache as the detection means set forth in note 3, in the cache, and determining store possibility when there is replacement.

Note 8:

A method and architecture provided with an instruction to suspend a logical processor (logical CPU)(hereinafter called "SUSPEND instruction"), capable of restoring the processor from the suspense by the store possibility detection means set forth in note 3, as a means for restoring the processor from the suspense.

Note 9:

The method and device according to note 8, for preventing the processor from resumption by address monitor by providing a means for instructing the SUSPEND instruction not to monitor an address in order to temporarily suspend without address monitor.

Note 10:

A method and a device for restoring the processor immediately after suspense entry or interpreting a SUSPEND instruction as a non-operation instruction when detecting store possibility before suspense.

Note 11:

A store possibility detection means according to note 3, with a mechanism for detecting a case where a specific logical processor writes data in the memory block monitoring range set forth in note 2, of shared cache in a configuration where one segment of cache can be shared by a plurality of logical processors, such as shared cache (GBS method), a processor in which one physical chip includes a plurality of processor cores (CMP method) and a processor in which one physical processor core is provided with a plurality of hardware threads (strand) and which can operate as if there were a plurality of logical processors (such as, MT method HMT, SMT, VMT, etc.).

Note 12:

The method and device according to note 1, which operates regarding the set of a fetch/store instruction to operate the same address block (such as a cas instruction, an instruction to atomically load data from memory and store memory) and a load instruction as an monitor/suspend instruction, instead of the LOAD-WITH-LOOKUP/SUSPEND instruction set forth in note 2 (can also be provided).

Note 13:

The method and device according to note 1, for regarding the fetch/store instruction of the set set forth in note 12 to be equivalent to a LOAD-WITH-LOOKUP instruction, instead of the SUSPEND instruction set forth in note 8 (can also be provided).

Note 14:

The method and device according to note 1, for regarding the load instruction set forth in note 12 to be equivalent to an SUSPEND instruction, instead of the SUSPEND instruction set forth in note 8 (can also be provided).

Note 15:

The method and device according to note 1, which operates regarding a plurality of fetch/store instruction in the neighborhood to operate the same address block (such as cas instruction, etc.) as an instruction to memory blocks, instead of the LOAD-WITH-LOOKUP/SUSPEND instruction set forth in note 2 (can also be provided).

Note 16:

The method and device according to note 1, for regarding the first fetch/store instruction of the set set forth in note 12 to be equivalent to a LOAD-WITH-LOOKUP instruction, instead of the SUSPEND instruction set forth in note 8 (can also be provided)

Note 17:

The method and device according to note 1, for regarding the second fetch/store instruction of the set set forth in note 15 to be equivalent to a load-with-lookup instruction, instead of the suspend instruction set forth in note 8 (can also be provided)

What is claimed is:

1. A method for controlling a first processor which executes a first thread and accesses information of a main memory through cache memory, comprising:

reading information stored in a target address or an address range of the main memory by issuing a particular load instruction that loads the information and monitoring whether a second processor occurs an update access to the address or the address range, wherein the monitoring starts when the particular load instruction is issued as a trigger;

entering the first processor into a suspense status in which the execution of the first thread is suspended; and releasing the first processor from the suspense status and resuming the execution of the first thread using the occurrence of the update access of an exclusive right request for acquiring an exclusive right of the main memory by the second processor executing a second thread as a trigger, and wherein realizing a possibility prediction, via the access, of a rewriting of a lock variable by the second processor for an exclusive control of memory access and suspending the execution of the first thread by entering the first processor into the suspense status to avoid an occurrence of a spin loop due to release waiting.

2. The processor control method according to claim 1, wherein if the occurrence of the update access by the second processor is detected between said reading and entering, the execution of said entering is suppressed.

3. The processor control method according to claim 1, wherein providing discrimination information for discriminating a storage area of the cache memory corresponding to a specific storage area of the main memory, in a part of cache management information for managing the cache memory;

granting said discrimination information to the storage area of the cache memory corresponding to the address or address range of the main memory which is accessed in said reading, as a monitor target; and releasing the first processor from the suspense status and resuming the execution of the first thread using an occurrence of an invalidating or a rewriting of said discrimination information by the second processor which granted to the storage area of the cache memory as a trigger in said releasing and resuming.

4. The processor control method according to claim 1, wherein in said entering, a clock supply to the first processor is suspended, and in said releasing, the clock supply is resumed.

5. The processor control method according to claim 1, wherein the entering, the releasing, and the resuming are started by a suspense instruction to enter the first processor into the suspense status, to release the first processor from the suspense status, and to resume the execution of the first thread, and a pair of a cas instruction and a combination load instruction combined with the cas instruction is regarded to be equivalent to a pair of the particular load instruction and the suspense instruction, the cas instruction being to exchange a memory content in a predetermined address range of the main memory for a predetermined value when the memory content coincides with a value stored in a predetermined register, and the combination load instruction being to read information stored in a same address range as the predetermined address range of the main memory.

6. A method for controlling a first processor which executes a first thread and accesses information of a main memory through cache memory, comprising:

detecting an instruction string composed of at least one of a first load instruction to collectively read and update information in a target address or an address range of the main memory and a second load instruction to read information about the address or address range;

monitoring whether a second processor occurs an update access to the address or the address range and also entering the first processor into a suspense status in which the execution of the first thread is suspended using detection of the instruction string including the first load instruction or the second load instruction as a trigger; and releasing the first processor from the suspense status and resuming the execution of the first thread using the occurrence of the update access of an exclusive right request for acquiring an exclusive right of the main memory from the second processor executing a second thread as a trigger, and wherein realizing a possibility prediction, via the access, of a rewriting of a lock variable by the second processor for an exclusive control of memory access and suspending the execution of the first thread by entering the first processor into the suspense status to avoid an occurrence of a spin loop due to release waiting.

7. The processor control method according to claim 6, wherein providing discrimination information for discriminating a storage area of the cache memory corresponding to a specific storage area of the main memory, in a part of cache management information for managing the cache memory;

granting said discrimination information to the storage area of the cache memory corresponding to the address or address range of the main memory which is accessed in said detecting, as a monitor target; and releasing the suspense status of the first processor using an occurrence of an invalidating or a rewriting of said discrimination information which granted to the storage area of the cache memory as a trigger in said releasing.

8. The processor control method according to claim 6, wherein in said monitoring, a clock supply to the first processor is suspended, and in said releasing, the clock supply is resumed.

9. A first processing device which executes a first thread, comprising:

an instruction control unit;

cache memory inserted between the instruction control unit and a main memory;

a load instruction to read information from the main memory into the instruction control unit;

a monitor trigger setting function to set a monitor start trigger for a specific storage area of the main memory, including a target access area of the load instruction by issuing the load instruction that loads the information; and a suspend release function suspending the execution of the first thread until an access of an exclusive right request for acquiring an exclusive right of the main memory to a lock variable for the specific storage area is accessed from a second processing device executing a second thread, and resuming the execution of the first thread, and wherein realizing a possibility prediction, via the access, of a rewriting of the lock variable by the second processing device for an exclusive control of memory access and suspending the execution of the first thread by entering the first processing device into a suspense status in which the execution of the first thread is suspended to avoid an occurrence of a spin loop due to release waiting.

10. A first processing device which executes a first thread, comprising:

an instruction control unit;

cache memory inserted between the instruction control unit and a main memory;

a load instruction to read information from the main memory into the instruction control unit; and a writing detection function to monitor an information in a specific storage area of the main memory by issuing the load instruction that loads the information, including a target access area of the load instruction and to detect a possibility that a second processing device, which executes a second thread, writes information of an exclusive right request for acquiring an exclusive right of the main memory into the specific storage area by issuing the load instruction that loads the information, and wherein realizing a possibility prediction, via the monitor, of a rewriting of a lock variable by the second processing device for an exclusive control of memory access and suspending the execution of the first thread by entering the first processing device into a suspense status in which the execution of the first thread is suspended to avoid an occurrence of a spin loop due to release waiting.

11. The first processing device according to claim 10, wherein part of cache management information for managing said cache memory comprises discrimination information for discriminating the storage area of said cache memory corresponding to the specific storage area of the main memory, and the storage area of the cache memory, to which the discrimination information is attached, is designated as the monitor target of said writing detection function.

12. The first processing device according to claim 10, wherein
said writing detection function comprises at least one register, and
a monitor address indicating the specific storage area is set in said register, and the specific storage area is monitored by comparing the monitor address with an access address to all segments of cache memory.

13. The first processing device according to claims 10, wherein if there is an instruction to nullify or rewrite information stored corresponding to the specific storage area of said cache memory by the second processing device, it is determined that there is a possibility of writing into the specific storage area.

14. An information processing device, comprising:
a first instruction control unit controlling an execution of a first thread;
a second instruction control unit controlling an execution of a second thread;
cache memory inserted between the instruction control units and a main memory;
a particular load instruction to read information stored in a target address or an address range of the main memory into the first instruction control unit; and
a suspense instruction to enter the first instruction control unit into a suspense status in which the execution of the first thread is suspended, to release the suspense status, and to resume the execution of the first thread using detection of a possibility of writing the information of an exclusive right request for acquiring an exclusive right of the main memory into the target address or the address range of the main memory by the second instruction control unit, including a target access area of the particular load instruction as a trigger, and
wherein realizing a possibility prediction, via the writing, of a rewriting of a lock variable for an exclusive control of memory access and suspending the execution of the first thread by entering the first instruction control unit into the suspense status to avoid an occurrence of a spin loop due to release waiting.

15. The information processing device according to claim 14, further comprising a clock supply control function to suspend and resume clock supply to the first instruction control unit in synchronization with entry to the suspense status by said suspense instruction and release from the suspense status.

16. The information processing device according to claim 14, wherein a pair of a cas instruction and a combination load instruction combined with the cas instruction is regarded to be equivalent to a pair of the particular load instruction and the suspense instruction, the cas instruction being to exchange a memory content in a predetermined address range of the main memory for a predetermined value when the memory content coincides with a value stored in a predetermined register, and the combination load instruction being to read information stored in a same address range as the predetermined address range of the main memory.

17. An information processing device provided with an exclusive control mechanism for exclusively controlling access to shared memory of a first instruction control unit controlling an execution of a first thread and a second instruction control unit controlling an execution of a second thread by rewriting specific information in a specific area of the shared memory, comprising:
a clock supply control function to suspend clock supply to the first instruction control unit so as to suspend the first thread execution by issuing a suspend instruction that suspends the clock supply while the first instruction control unit is issuing a load instruction and starts monitoring for rewriting of the specific information by a second instruction control unit as a trigger by loading the specific information using the load instruction and restore the clock supply of the first instruction control unit when access of an exclusive right request for acquiring an exclusive right of the main memory to the specific information by the second instruction control unit is detected, thereby realizing, via the access, a possibility prediction of a rewriting of a lock variable by the second instruction control unit for an exclusive control of memory access and suspending the execution of the first thread by entering the first instruction control unit into a suspense status in which the execution of the first thread is suspended by the suspend instruction to avoid an occurrence of a spin loop due to release waiting.

18. An information processing device, comprising:
a first instruction control unit controlling an execution of a first thread;
a second instruction control unit controlling an execution of a second thread;
cache memory which is inserted between each of the instruction control unit and a main memory and is shared by the plurality of instruction control units; and
a writing detection function to notify the first instruction control unit of a fact that the second instruction control unit has written information of an exclusive right request for acquiring an exclusive right of the main memory into a specific storage area of the main memory by issuing a load instruction that loads the information from the first instruction control unit, and
wherein realizing, via the notification, a possibility prediction of a rewriting of a lock variable by the second instruction control unit for an exclusive control of memory access and suspending the execution of the first thread by entering the first instruction control unit into a suspense status in which the execution of the first thread is suspended to avoid an occurrence of a spin loop due to release waiting.

19. The information processing device according to claim 18, wherein each of said instruction control units comprises
- a suspense instruction to enter the relevant instruction control unit into the suspense status, to release the suspense status, and to resume the execution of the first thread using notification from said writing detection function as a trigger.

20. A first processor which executes a first thread and has an instruction set, said instruction set comprising:
- a load instruction to access a main memory through cache memory and to read information form the main memory;
- a specific instruction to set existence/non-existence of writing in a target address or an address range of the main memory by a second processor executing a second thread, including a target access area of the load instruction that loads an information stored in the target address or the address range of the main memory as a monitor start trigger; and
- a suspend/release instruction suspending the first processor until a lock variable is accessed by an exclusive right request for acquiring an exclusive right of the main memory issued by the second processor, when access is prevented, wherein
- realizing a possibility prediction of a rewriting of the lock variable for an exclusive control of memory access by the second processor and suspending the execution of the first thread by entering the first processor into a suspense status in which the execution of the first thread is suspended to avoid an occurrence of a spin loop due to release waiting.

21. A first processing device which executes a first thread and accesses information of a main memory through cache memory, comprising:
- a first function to detect an instruction string composed of at least one of a first load instruction to collectively read and update information in a target address or an address range of the main memory and a second load instruction to read information about the address or the address range; and
- a second function to monitor whether a second processing device executing a second thread occurs an update access to the address or the address range and also to enter the first processing device into a suspense status in which the execution of the first thread is suspended, using detection of the instruction string including the first load instruction or the second load instruction as a trigger; and
- a third function to release the first processing device from the suspense status and to resume the execution of the first thread using the occurrence of the update access of an exclusive right request for acquiring an exclusive right of the main memory to the address or address range from the second processing device as a trigger, and
- wherein realizing, via the access, a possibility prediction of a rewriting of a lock variable for an exclusive control of memory access by the second processing device and suspending the execution of the first thread by entering the first processing device into the suspense status to avoid an occurrence of a spin loop due to release waiting.

22. Cache memory which is inserted between a plurality of instruction control units and a main memory and temporarily stores information transmitted/received between the main memory and a first instruction control unit, which is one of the plurality of instruction control units and which controls an execution of a first thread, comprising:
- a writing detection function to detect a possibility that a second instruction control unit, which is one of the plurality of instruction control units and which controls an execution of a second thread, writes information of an exclusive right request for acquiring an exclusive right of the main memory into a specific storage area of the main memory by issuing a load instruction to read the information from the main memory into the first instruction control unit; wherein
- the first instruction control unit is provided with a load instruction to set a monitor start trigger of a memory block including a memory block to be loaded and a writing detection function to monitor the memory block;
- the first instruction control unit suspends by entering the first instruction control unit into a suspense status in which the execution of the first thread is suspended; and
- the first instruction control unit executes/releases a suspense instruction to release the first instruction control unit from the suspense status in accordance with the load instruction and a detection result of the writing detection function.

23. The cache memory according to claim 22, wherein
- part of cache management information for managing said cache memory comprises discrimination information for discriminating a storage area of said cache memory corresponding to the specific storage area of the main memory, and the storage area of the cache memory, to which the discrimination information is attached, is designated as the monitor target of said writing detection function.

24. The cache memory according to claim 22, wherein
- said writing detection function comprises at least one register, and
- a monitor address indicating the specific storage area is set in said register, and the specific storage area is monitored by comparing the monitor address with an access address to all segments of cache memory.

25. A method for controlling a first processor which executes a first thread and accesses information of a main memory through cache memory, comprising:
- reading information stored in a target address or an address range of the main memory by issuing a load instruction that loads the information and monitoring whether a second processor occurs an update access to the address or the address range, wherein the monitoring starts when the load instruction is issued as a trigger;
- entering the first processor into a suspense status in which the execution of the first thread is suspended; and
- releasing the first processor from the suspense status and resuming the execution of the first thread using the occurrence of the update access of an exclusive right request for acquiring an exclusive right of the main memory by the second processor executing a second thread as a trigger; wherein
- the first processor is provided with a load instruction to set a monitor start trigger of a memory block including a memory block to be loaded and a writing detection function to monitor the memory block, and the first processor is suspended by entering the first processor into the suspense status in which the execution of the first thread is suspended and resumed by executing/releasing a suspense instruction to release the first processor from the suspense status in accordance with the load instruction and a detection result of the writing detection function.

* * * * *

UNITED STATES PATENT AND TRADEMARK OFFICE
CERTIFICATE OF CORRECTION

PATENT NO. : 7,853,756 B2  Page 1 of 1
APPLICATION NO. : 10/937253
DATED : December 14, 2010
INVENTOR(S) : Masaki Ukai It is certified that error appears in the above-identified patent and that said Letters Patent is hereby corrected as shown below:

Column 17, Line 35 in Claim 13, delete "claims" and insert -- claim --, therefor.

Signed and Sealed this
Tenth Day of May, 2011

David J. Kappos
*Director of the United States Patent and Trademark Office*